(12) United States Patent
Trionfetti

(10) Patent No.: US 10,052,740 B2
(45) Date of Patent: Aug. 21, 2018

(54) DYNAMIC BALANCING PROCESS AND DEVICE FOR A ROTATING BODY

(71) Applicant: BALANCE SYSTEMS S.R.L., Milan (IT)

(72) Inventor: Gianni Trionfetti, Agrate Brianza (IT)

(73) Assignee: BALANCE SYSTEMS S.R.L., Milan (IT)

( * ) Notice: Subject to any disclaimer, the term of this patent is extended or adjusted under 35 U.S.C. 154(b) by 0 days.

(21) Appl. No.: 14/425,450

(22) PCT Filed: Oct. 2, 2013

(86) PCT No.: PCT/IB2013/059073
§ 371 (c)(1),
(2) Date: Mar. 3, 2015

(87) PCT Pub. No.: WO2014/054010
PCT Pub. Date: Apr. 10, 2014

(65) Prior Publication Data
US 2015/0202734 A1 Jul. 23, 2015

(30) Foreign Application Priority Data

Oct. 2, 2012 (EP) .................................... 12187044

(51) Int. Cl.
*B24B 41/04* (2006.01)
*G01M 1/22* (2006.01)
(Continued)

(52) U.S. Cl.
CPC ............ *B24B 41/042* (2013.01); *G01M 1/02* (2013.01); *G01M 1/22* (2013.01); *G01M 1/32* (2013.01); *G01M 1/36* (2013.01)

(58) Field of Classification Search
CPC ......... B24B 23/04; B24B 23/03; B24B 23/02; B24B 21/20; G01M 1/01; G01M 1/22; G01M 1/32; G01M 1/36
(Continued)

(56) References Cited

U.S. PATENT DOCUMENTS 3,698,263 A 10/1972 Ito
4,729,194 A * 3/1988 Maier ..................... B24B 23/04
451/357
(Continued)

FOREIGN PATENT DOCUMENTS

EP 0 409 050 A2 1/1991
EP 0409050 A2 * 1/1991 ......... B23Q 11/0035

OTHER PUBLICATIONS

The European Search Report for EP Application No. 12 18 7044, completed Mar. 12, 2013, two pages.

*Primary Examiner* — Monica Carter
*Assistant Examiner* — Lauren Beronja
(74) *Attorney, Agent, or Firm* — Vorys, Sater, Seymour and Pease LLP; Ari Zytcer

(57) ABSTRACT

Provided is a balancing device for a rotating body defining an axis of rotation, including a plurality of balancing heads aligned along the axis of rotation, each balancing head including: balancing masses configured to be moved at least along a circumference of movement so as to cancel the unbalance of the rotating body; at least one motor configured to move the balancing masses independently, the balancing masses part of different balancing heads being mutually spaced along the axis of rotation; unbalance detecting means including a plurality of vibration detectors configured to measure the vibrations caused by the unbalance of the rotating body.

3 Claims, 3 Drawing Sheets

(51) Int. Cl.
*G01M 1/02* (2006.01)
*G01M 1/36* (2006.01)
*G01M 1/32* (2006.01)

(58) Field of Classification Search
USPC ....... 451/357, 343, 5, 177; 72/468, 460, 458
See application file for complete search history.

(56) References Cited

U.S. PATENT DOCUMENTS

| | | |
|---|---|---|
| 6,189,372 B1 | 2/2001 | Danz |
| 6,206,771 B1 * | 3/2001 | Lehman .................. B24B 23/03 451/345 |
| 8,291,764 B2 * | 10/2012 | Lenz ....................... G01M 1/16 700/279 |
| 2004/0243283 A1 * | 12/2004 | Montanari .............. G01M 1/36 700/279 |
| 2006/0005623 A1 | 1/2006 | Hildebrand et al. |
| 2006/0065415 A1 * | 3/2006 | Berg ....................... B24B 23/03 173/2 |

\* cited by examiner

DYNAMIC BALANCING PROCESS AND DEVICE FOR A ROTATING BODY

The present invention relates to a dynamic balancing device and process for a rotating body of the type specified in the preamble of the independent claims.

In particular, the invention concerns a device and a process suitable to recover the dynamic unbalance of a tool. More particularly, such device and process are for use with a grinding machine and, to be precise, a grinding wheel, so as to cancel the unbalance.

As is known, tools may have dynamic and/or rotating unbalance.

Rotating unbalance occurs when the tool is not perfectly balanced with respect to its axis of rotation, that is when its centre of mass does not lie on the axis of rotation.

Dynamic unbalance, on the other hand, refers to the unbalance which occurs along section planes which intersect the axis of the grinding wheel. There may be a plurality of normal sections, perpendicular to the axis of rotation of the tool, with rotating unbalances which compensate one another but give rise to undesirable moments along axes perpendicular to the axis of rotation of the tool. Such unbalance thus occurs along two planes.

Said dynamic and/or rotating unbalance cause undesired vibrations when the tool is made to rotate and thus determine poor quality machining and various drawbacks.

In order to avoid such problems, whenever a grinding wheel is fitted to the grinding machine, the operator balances said grinding wheel using suitable devices and counterweights.

Despite the initial balancing, as the grinding wheel wears out its centre of mass tends to change and move away from the axis of rotation. During machining processes, the grinding wheel is subject to deformation and wear which modify its geometry, causing unbalance.

Balancing devices and processes capable of evaluating the rotating unbalance of the grinding wheel thus continuously change the position of the centre of mass of the grinding wheel in order to re-balance it.

They generally comprise two mutually moveable masses suitable to cancel the unbalance that occurs, a sensor suitable to detect the unbalance of the grinding wheel and a control apparatus suitable to control the motion of the masses as a function of the unbalance.

The prior art cited above has some important drawbacks.

One first drawback is due to the fact that the known balancing devices are unable to perform dynamic balancing of a rotating body.

A second important drawback consists of the fact that the known devices perform balancing by means of a particularly lengthy process, as the masses are moved in a substantially random manner. Once the unbalance has been detected, the balancing process consists of moving the masses to a position and then measuring the difference in unbalance with respect to the previous position. If the result is not as expected, namely if the grinding wheel is not correctly balanced, the process has to be repeated until the position of the masses is such as to cancel the unbalance of the grinding wheel.

A further drawback thus lies in the fact that given the length of time it takes to perform the balancing process, machine cycle times are increased.

A further defect consists in the fact that, due to the wear on the grinding wheel and the need to have a constant tangential speed, the known devices are not able to balance the grinding wheel and the operator is therefore forced to interrupt the machining process to set the machine.

Said drawback is of particular importance in the case of rotating grinding wheels with a long axial extension, such as those for machining gears.

In this situation the technical purpose of the present invention is to provide a dynamic balancing device and process for a rotating body, able to substantially overcome the drawbacks mentioned above.

Within the scope of said technical purpose an important aim of the invention is to obtain a balancing device and process capable of dynamically balancing the part being machined.

A further aim of the invention is to provide a balancing device and process able to ensure the practically perfect and fast balancing of a rotating body.

Another important aim of the invention is thus to provide a balancing device and process which make it possible to achieve high quality products.

A further aim of the invention is to provide a balancing device and process capable of achieving the ideal static and dynamic balancing of the grinding wheel. The technical purpose and the specified aims are achieved with a balancing device and process for a rotating body as claimed in the appended independent Claims.

Preferred embodiments are described in the dependent claims.

The characteristics and advantages of the invention are clearly evident from the following detailed description of a preferred embodiment thereof, with reference to the accompanying drawings, in which.

Figure 1:
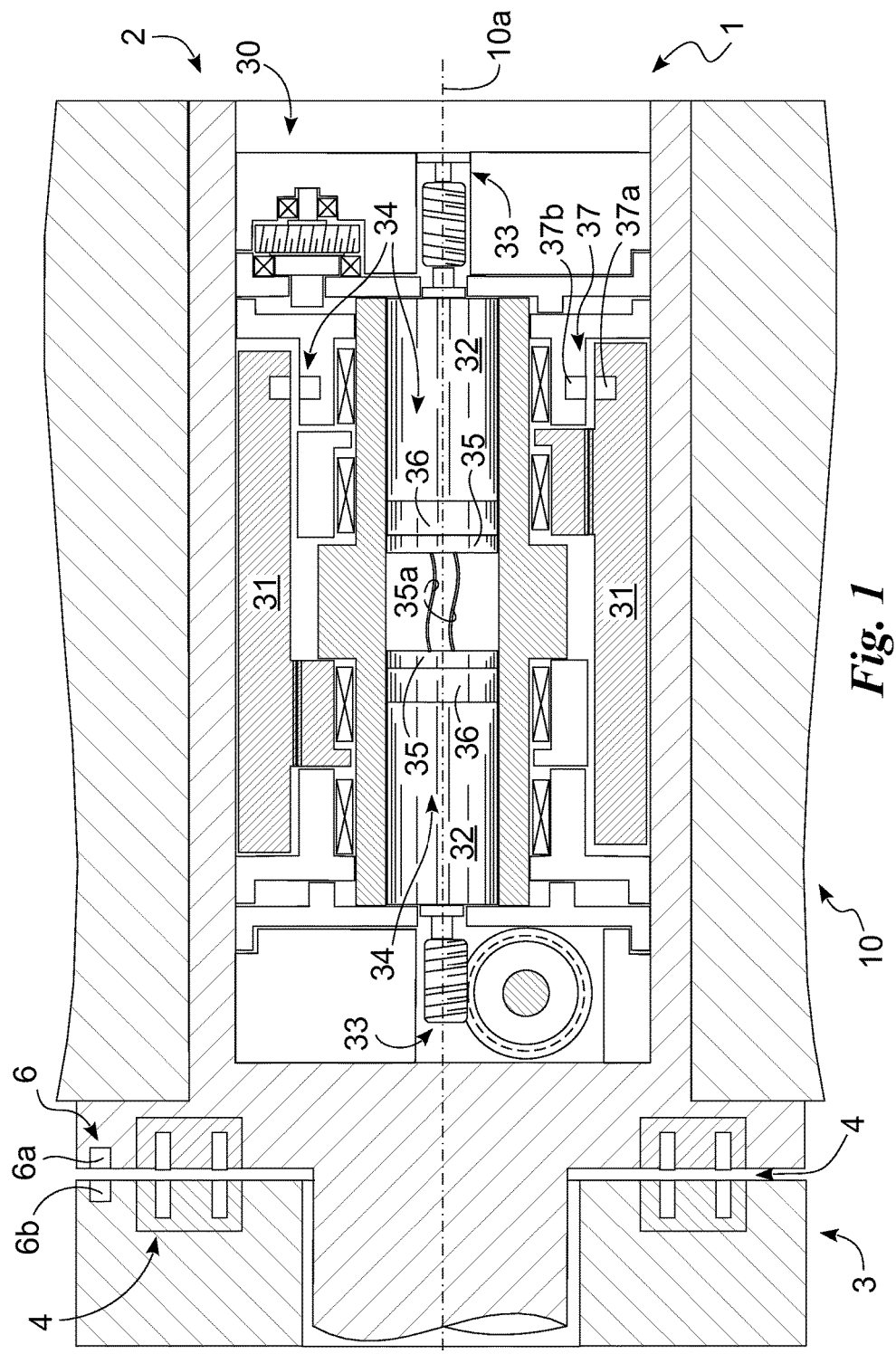
FIG. 1 shows part of a balancing device for a rotating body according to the invention.

With reference to said Figures, a balancing device for a rotating body is globally indicated with reference number 1.

It is suitable to be connected to a rotating body 10, suitable to be made to rotate about an axis of rotation 10a, so as to balance at least one type of unbalance. In detail, the device 1 is suitable to be integrally connected to the rotating body 10 and, more precisely, to be housed inside the rotating body 10, on the axis thereof, so as to rotate about the axis 10a integrally therewith.

Preferably, the balancing device 1 is suitable to be used on a tool, more preferably a grinding machine and, more precisely, to be coupled to a grinding wheel, which constitutes the rotating body 10, so as to measure and cancel the unbalance thereof during a machining process.

Figure 3:
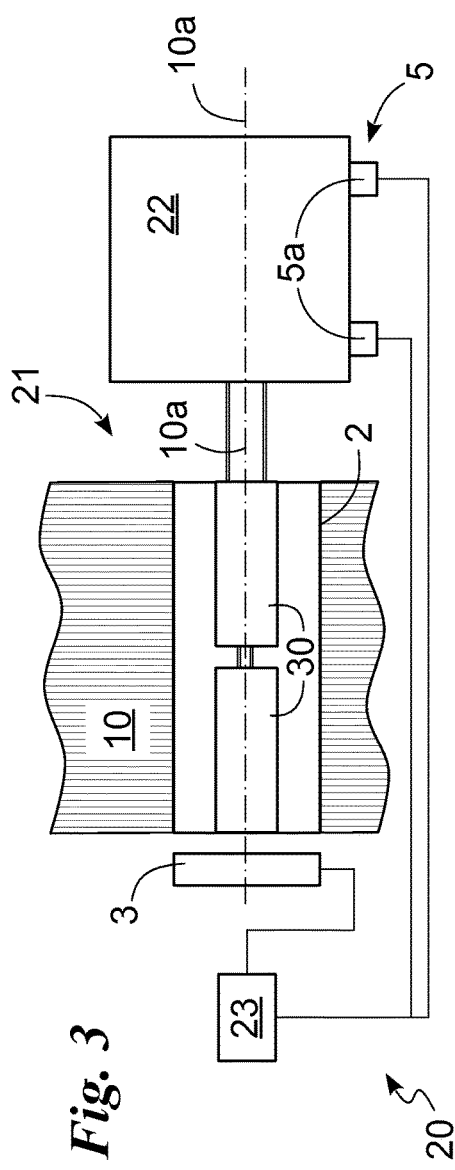
FIG. 3 shows a balancing system which includes the device according to the invention.

The rotating body 10 or tool is itself part of a machine tool 20 comprising a rotating portion 21, including the rotating body 10, a fixed portion 22 and a control unit 23 suitable to control the operation of the balancing device (FIG. 3).

The balancing device 1 mainly comprises a rotating portion 2 suitable to be integrally connected to the rotating body 10, preferably internally, and to the rotating portion 21 so as to rotate about the axis of rotation 10a; and a fixed portion 3, suitable to be connected to the fixed portion 22 adjacent to the rotating portion 2 and to be connected to the control unit 23 by means of a wire.

In particular, the rotating portion 2 and the fixed portion 3 are electrically connected by means of a wireless connection, in particular of the inductive type. In detail, the connection between the rotating portion 2 and the fixed portion 3 is obtained by means of two coils 4 one of which is coupled to the rotating portion 2 and the other to the fixed portion 3, and suitable to mutually communicate by induction, and more precisely, by exploiting a variation in the magnetic field in a coil 4 in order to create in the other coil 4 a current proportional to said variation of magnetic field. An example of such wireless connection is described in patent IT-A-MI5090100 (see from page 3 line 23 to page 8 line 10 and FIGS. 1, 3 and 4) owned by this same applicant.

The balancing device 1 further comprises unbalance detecting means 5 suitable to measure the vibrations caused by the unbalance of the rotating body 10. Said means preferably comprise a plurality of vibration detectors 5a, preferably two. These are preferably mutually spaced, in particular mutually spaced along the axis of rotation 10a, and preferably arranged at said fixed portion 22. The vibration detectors 5a are appropriately electrically connected to the control unit 23 by means of wires and the like.

The balancing device 1 also comprises a plurality of balancing heads 30, preferably two, suitable to re-balance the rotating body 10 as a function of the unbalance measured by the unbalance detecting means 5. Said heads 30 are preferably aligned along the axis of rotation 10a and may be arranged so as to come into contact with one another, and thus at a distance which depends on the outside dimensions of the heads 30, or be mutually spaced.

Figure 2:
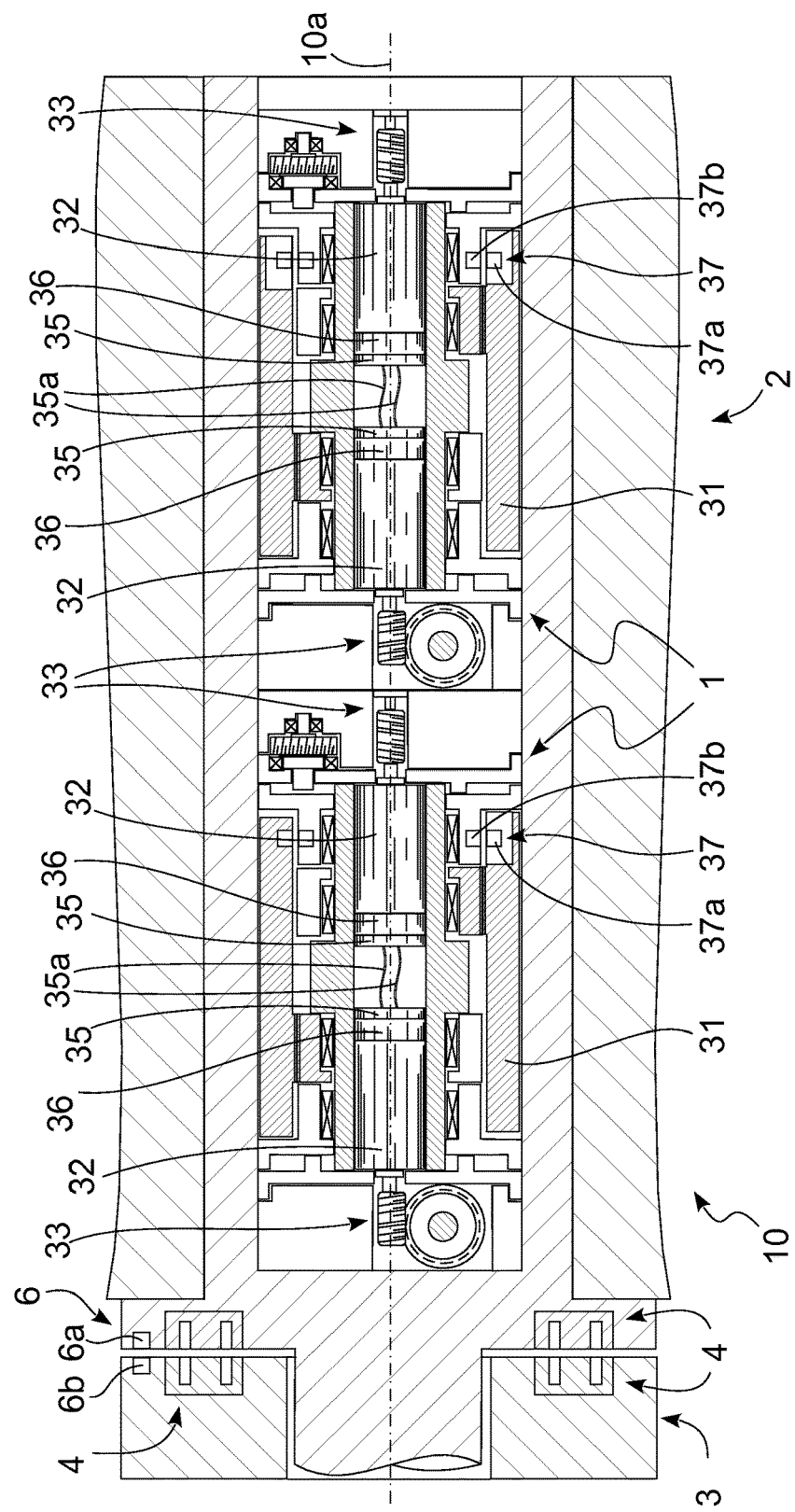
FIG. 2 is a sagittal cross-sectional view of a balancing device according to the invention.

In particular, in the case in which the rotating body 10 has a great extension along the axis of rotation 10a with respect to the length of the diameter, such as in particular the grinding wheels for gears, the balancing device 1 is appropriately provided with balancing heads 30 (FIG. 2), housed inside the rotating portion 3, integrally connected to the rotating body 10 preferably at the bases of said rotating body 10.

The unbalance detecting means 5, and in particular the vibration detectors 5a may consist of any sensor, appropriately a piezoelectric sensor, suitable to measure the unbalance of the rotating body 10. Preferably, each unbalance detector 5a consists of the sensor described in Patent EP-A-1645362 (paragraphs [0031]-[0082], FIG. 1 and FIGS. 5-10) owned by this same applicant. The balancing head 30 is similar to the balancing heads described in Patents EP-A-0409050 (from column 3 line 34 to column 5 line 53 and FIGS. 1-3) or IT-A-MI5081953 (from page 3 line 12 to page 8 line 8 and FIGS. 1, 2a and 2b), both owned by this same applicant.

Each head 30 comprises two balancing masses 31 suitable to be moved so as to cancel the unbalance of the rotating body 10, at least one motor 32 suitable to move the balancing masses 31 independently and a transmission mechanism 33 suitable to transmit the motion from the motors 32 to the balancing masses 31.

The balancing masses 32 of different balancing heads 30 are thus mutually spaced along the axis of rotation 10a, that is to say, their mass centres do not coincide along said axis. On the other hand, the balancing masses 32 of a same balancing head 30 appropriately have the same mass centre position along the axis of rotation 10a.

In particular, each balancing head 30 comprises two motors 32, one for each balancing mass 31, which extend symmetrically along the axis of rotation 10a. Appropriately, the motors 32 are electric motors and, more appropriately, BC motors.

The balancing masses 31 are substantially identical and preferably have a profile in the shape of an arc of circumference, substantially centred on the axis of rotation 10a. They are suitable to be translated along a circumference of movement substantially concentric with the axis of rotation 10a and lying on a plane substantially perpendicular to the axis of rotation 10a.

The transmission mechanism 33, of a type known per se, defines a transmission ratio between the balancing masses 31 and motors 32 substantially comprised between $1/8000$ and $1/1500$ and, preferably substantially equal to $1/10000$.

Advantageously, each balancing head 30 comprises, in addition to the aforesaid components, at least one position sensor 34 suitable to monitor the position of the balancing masses 31; and at least one control card 35 suitable to transmit the signals from, and also preferably to, the motors 32.

The position sensor 34 is suitable to detect the absolute position of any single balancing mass 31 along the circumference of movement so as to permit the motors 32 to control the mutual movement of the masses 31 along the same circumference, as a function both of their initial position and of the unbalance of the rotating body 10, as detected by the vibration detectors 5a.

In particular, each position sensor 34 comprises a displacement sensor 36, suitable to verify the movement and displacement of the masses 31. In detail the displacement sensor 36 consists of an encoder, functionally connected to a single motor 32 and suitable to detect the activation and the respective number of revolutions or portions of revolution, and the consequent movement of the connected balancing mass 31.

The displacement sensor 36 consisting of the encoder achieves a high level of precision considering said transmission ratio between the balancing masses 31 and motors 32, so that a complete revolution of a motor is followed by a rotation of the mass 31 at an angle, with respect to the axis 10a, of $1/10000$ of a turn, namely approximately of one thirtieth of a degree.

The position sensors 34 comprise at least one reference sensor 37, suitable to determine the position of the masses 31 with reference to the rotating portion 2, for at least one angular position. It preferably consists of a magnetic element 37a placed on each mass 31 and of a sensitive element 37b interfaced with said magnetic element 37a.

Through the presence of the reference sensor 37 and of the displacement sensor 36, the position sensors are thus suitable to determine, at each instant, the position of each mass 31 with reference to the rotating portion 2.

The control card 35 consists of an electronic card. There is appropriately one card 35 for each motor 32, positioned at one end of said motor 32.

It receives the analogical input signals, and preferably also the output signals from the position sensors 34 coupled preferably to a single motor 32. In particular, the control card 35 receives signals from the displacement sensor 36 and preferably also from the reference sensors 37. Said card 35 is suitable to preferably convert the received signals from analogical to digital format. The digital signal is then transmitted by two electric wires 35a leading from the rotating portion 2. The same functions are preferably also performed for input signals sent to the motors.

Furthermore, due to the fact that the rotating portion 2 comprises two or four motors 32, and consequently two or four cards 35, the same two wires 35a appropriately transfer the signal from and to a plurality of cards 35 and preferably from all the cards 25, so as to substantially create a network consisting of said cards 35.

Such solution means it is possible to have two electric wires 35a leading from the balancing head 30 instead of the plurality of electric wires, two for each card 35 and thus at least four or eight, which would have been necessary in the absence of such innovation. Such plurality of wires would have caused significant problems during assembly for the passage of the wires.

The control card 35 can easily be produced by the person skilled in the art using his common general knowledge.

Lastly, the balancing device 1 comprises detection means 6, suitable to measure the angular position a of the rotating body 10 with respect to the fixed portion 22 about said axis of rotation 10a, in particular during the execution of a machining process.

Said detection means 6 comprise at least one magnet 6a, selectively connected to the rotating portion 2 or to the fixed portion 3, and a Hall sensor 6b or other similar sensor suitable to detect said magnetic field and selectively arranged in front of the magnet 6a either on the fixed portion 3 or on the rotating portion 2. In particular, the detection means 6 comprise two magnets 6a symmetrically arranged with respect to the axis of rotation 10a and connected to the rotating portion 2 so as to face the fixed portion 3 and a Hall sensor 6b connected to the fixed portion 3 and facing the rotating portion 2.

The functioning of a balancing device for a rotating body, described above in a structural sense, is as follows.

In particular, the functioning of the balancing device 1 defines a novel balancing process for a rotating body 10.

This balancing process briefly comprises a start-up phase, a measurement phase, in which at least the unbalance of the rotating portion 22 is measured, and a balancing phase, in which the two balancing masses 31 are moved along the circumference of movement.

First, in the start-up phase, the device 1 measures the initial position in which the balancing masses 31 are arranged inside the balancing head 30 along the circumference of movement, by means of the sensors 34. Moreover, the value of the balancing masses 31 is sent to the control unit 23 by means of a simple data entry process performed by the user of other method.

Having defined the initial position, the start-up phase ends and the operator sets in rotation the rotating body 10 about the axis of rotation 10a to start the machining process.

First of all, a calibration phase is activated from time to time. In this calibration phase each balancing head 30 is preferably activated individually at different times, and combinations of balancing heads 30 may be activated together.

In particular, each balancing head 30 generates an unbalance which changes, by a known amount, the position of the balancing masses 31 along the circumference of movement, while the position sensor 34 detects the position of said masses 31. The size and the position of the unbalance are thus measured directly through the direct and precise identification of the size and position of the balancing masses 31. Said measurement is preferably performed by the position sensor 34.

At the same time the unbalance detecting means 5 and, in particular each vibration detector 5a, measures the vibrations caused by said unbalance and is able to perform a precise and biunivocal correlation between the vibrations measured and the size and position of the unbalance.

It is, in fact, not sufficient to know the position and the size of the unbalance to calculate the vibrations caused thereby with precision. The vibrations also depend on the mass, diameter, speed and other factors associated with the rotating portion 21 of the machine tool 20. These parameters are not always known or not known with the required degree of precision.

Since such parameters of the rotating portion 21 vary according to the wear on the grinding wheel or other tool which is a part of the rotating portion 21, the calibration phase is performed from time to time, especially when the tool becomes worn and there is any change in the speed of rotation.

These measurements are appropriately stored so that, when the tool is replaced, the calibration phases do not need to be repeated, because the balancing device 1 can use the data in the database that has been created.

Figure 4:
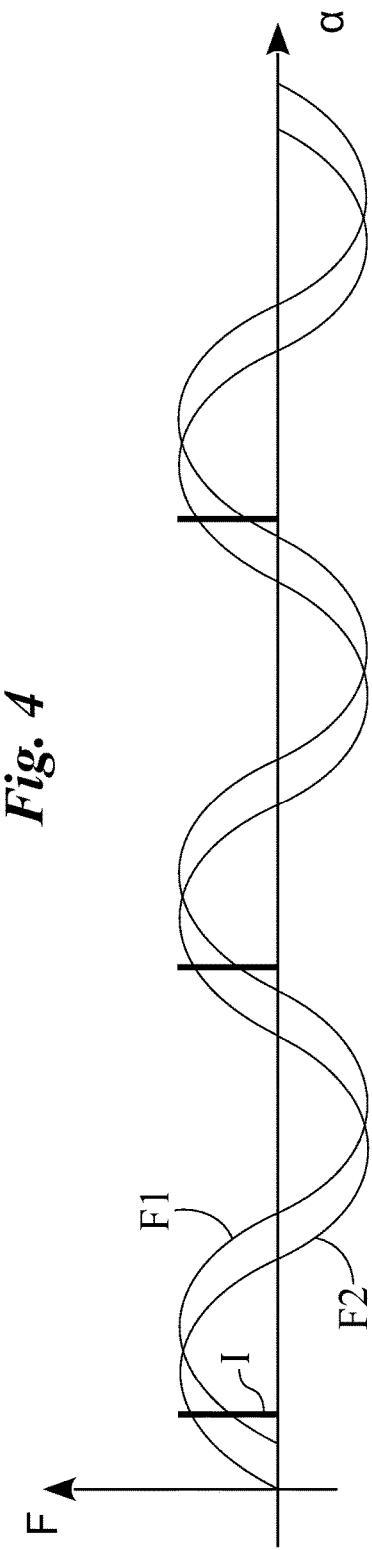
FIG. 4 shows possible measurements of the balancing device.

Moreover, by knowing the position of the unbalance inside the balancing head 30, thus with reference to the rotating portion 21, and through the detection means 6, it is possible to correlate the position of the unbalance with reference to the fixed portion 22. In detail, during such measurement phase, the vibration detectors 5a detect the unbalance of the rotating body 10 along a given angular position. One example of such measurement is shown in FIG. 4, where the force F (F1 or F2 as two vibration detectors 5 are preferably provided) is plotted on the ordinate and the angular position a of the rotating body on the abscissa. The position sensor 34 detects the position of the balancing masses 31 along the circumference of movement.

Furthermore, in such calibration phase, the detection means 6 measure, by exploiting the Hall effect, the angular position a of the rotating portion 2 with respect to the fixed portion 3, namely the angular position of the rotating portion 21 and of the connected rotating body 10. In FIG. 4, an example is given of the measurement of the angular position a of the rotating body 10 in which the peaks correspond to the overlapping of the pulses I given by the magnets 6a to the Hall sensor 6b.

The absolute position, that is the position in relation to the fixed portion 22, is thus precisely correlated with the size of the unbalance in relation to the vibrations read by the two different vibration detectors 5a.

Moreover, since there are at least two vibration detectors 5a, arranged at a distance from one another, and since there are at least two balancing heads 30, the unbalance is identified and correlated with the vibrations measured along the axial and circumferential positions of the rotating portion and of the connected rotating body 10.

After the calibration phase, or separately from these, the unbalance measurement and balancing phases are performed.

In the measurement phase, the balancing device 1 measures the vibrations caused by the unbalance of the rotating portion 21 and of the connected rotating body 10 by means of the means 5 and in particular by means of the vibration detectors 5a. The vibrations measured are precisely correlated with the unbalance of the rotating portion 21, of which the size and axial and circumferential position are calculated with precision, preferably with reference to the fixed portion 22, thanks to the calibration phase described above.

In the balancing phase the control unit 23 calculates the position of the masses 31 of the balancing heads 31 necessary in order to cancel the unbalance measured and controls said heads so that said masses 31 are subsequently moved so as to correct the unbalance in the axial and circumferential directions, and thus correct the dynamic and/or rotating unbalance of the rotating portion and of the connected rotating body 10.

As a consequence, the balancing and the movement are not performed as random operations, but directly from the initial position to the balanced position.

The invention achieves some important advantages.

One first important advantage is that the device 1 is capable of recovering dynamic unbalance.

Another important advantage consists of the fact that, thanks to the position sensor 34 which detects the position of the balancing masses 31 along the circumference, the balancing device 1 identifies the position of the masses 31 along the circumference at any time and is therefore capable of detecting the displacement of the masses in order to recover the unbalance of the rotating body 10.

With the devices and processes known in the prior art, the position of the balancing masses at any time was practically unknown and the balancing masses 31 therefore had to be moved at random. The device 1, on the other hand, knows the position of the balancing masses 31 at any time, and so can easily identify how said masses should be moved.

Such capacity is further enhanced by the fact that, with the detection means 6, the device 1 and the process, by detecting the angular position a of the rotating body 10, identify the position which the balancing masses 31 must assume in order to cancel the unbalance.

Another advantage is that, due to the presence of the position sensor 34 and, furthermore, of the detection means 6, the balancing device 1 and process cancel the unbalance in an extremely short time.

Unlike with the prior art devices and processes, the grinding machine thus achieves particularly high levels of efficiency and precision.

Another important advantage is that, thanks to a reduced transmission ratio between the motors 32 and the masses 31, the device 1 positions the masses 31 with a high level of precision, thus ensuring the almost total cancellation of the unbalance of the rotating body 10.

Modifications and variations may be made to the invention described herein without departing from the scope of the inventive concept as expressed in the claims. All the elements as described and claimed herein may be replaced with equivalent elements and the scope of the invention includes all other details, materials, shapes and dimensions.

The invention claimed is:

1. A balancing process for a rotating body using a balancing device, said balancing device defining an axis of rotation, comprising:
    unbalance detecting means configured to measure vibrations caused by unbalance of said rotating body;
    a plurality of balancing heads aligned along said axis of rotation and each comprising balancing masses configured to be moved to cancel said unbalance of said rotating body, wherein said balancing masses that are part of different balancing heads being mutually spaced along said axis of rotation, wherein each of said balancing heads further comprises at least one position sensor configured to identify the position of said balancing masses, and wherein each position sensor is configured to determine, at each instant, the position of each mass with reference to the rotating portion;
    said balancing process comprising
        a calibration phase where each balancing head is activated separately to modify the position of the balancing masses creating an unbalance, the size and the position of said unbalance created by said balancing masses of each balancing head are measured directly by identifying the positions of said balancing masses and the size thereof, the vibrations caused by said unbalance are measured by said unbalance detecting means, so as to obtain a correlation between said measured vibrations and said size and position of said unbalance,
        a measurement phase in which the vibrations caused by the unbalance of said rotating body are measured, by means of said unbalance detection means, and the size and position of the unbalance of said rotating body are thus calculated, by means of said correlation, and
        a balancing phase in which the position that said balancing masses of said balancing heads must assume to cancel said unbalance is calculated, and said balancing masses are subsequently moved to correct said dynamic and/or rotating unbalance of said rotating body,
    wherein said rotating body is connected to a fixed portion which does not rotate,
    wherein in said calibration phase the position of said unbalance is measured with reference to said fixed portion, and
    wherein said position of said unbalance with reference to said fixed portion is obtained by:
        direct measurement of the positions of said balancing masses with reference to said balancing head which includes said balancing masses,
        the measurement of the angular position ($\alpha$) of said rotating body with respect to said fixed portion about said axis of rotation,
        the measurement, by means of the analysis of the vibrations and forces measured by said vibration sensing means, of the position of said unbalance generated by said balancing masses of each balancing head, with respect to said fixed portion about said axis of rotation, and
        the subsequent correlation between the position of said balancing masses with reference to said balancing head and with reference to said fixed portion.

2. The balancing process according to claim 1, wherein at least part of said calibration phase is performed regularly, when there are any changes in the physical properties of said rotating body.

3. The balancing process according to claim 1, wherein said measured vibrations and said size and position of said unbalance obtained from said calibration phases are stored and retrieved when conditions of said rotating body are once again identical to said size and position of said unbalance of said rotating body.

* * * * *